(12) United States Patent
Santoro et al.

(10) Patent No.: US 10,268,707 B2
(45) Date of Patent: Apr. 23, 2019

(54) EMBEDDED EVENT STREAMING TO A TRANSACTIONAL HIGHLY-AVAILABLE IN-MEMORY DATABASE

(71) Applicant: VoltDB, Inc., Bedford, MA (US)

(72) Inventors: Stefano M. Santoro, Boston, MA (US); Anish Khanzode, Winchester, MA (US); Ryan Betts, Framingham, MA (US)

(73) Assignee: VoltDB, Inc., Bedford, MA (US)

( * ) Notice: Subject to any disclaimer, the term of this patent is extended or adjusted under 35 U.S.C. 154(b) by 132 days.

(21) Appl. No.: 15/377,010

(22) Filed: Dec. 13, 2016

(65) Prior Publication Data

US 2017/0169058 A1    Jun. 15, 2017

Related U.S. Application Data

(60) Provisional application No. 62/266,990, filed on Dec. 14, 2015.

(51) Int. Cl.
| | | |
|---|---|---|
| *G06F 11/07* | (2006.01) | |
| *G06F 17/30* | (2006.01) | |
| *G06F 11/20* | (2006.01) | |

(52) U.S. Cl.
CPC .... *G06F 17/30289* (2013.01); *G06F 11/2094* (2013.01); *G06F 2201/80* (2013.01); *G06F 2201/82* (2013.01)

(58) Field of Classification Search
CPC .................................................. G06F 11/2094
USPC ....................................................... 714/4.11
See application file for complete search history.

(56) References Cited

U.S. PATENT DOCUMENTS

| | | | | |
|---|---|---|---|---|
| 6,607,136 B1* | 8/2003 | Atsmon | ................... | G06F 21/34 235/487 |
| 8,560,421 B1* | 10/2013 | Erlanger | ................ | G06Q 40/06 705/36 R |
| 2004/0002906 A1* | 1/2004 | Von Drehnen | ......... | G06Q 20/10 705/31 |
| 2004/0030611 A1* | 2/2004 | Byrne | ................... | G06Q 10/087 705/26.2 |
| 2007/0083642 A1* | 4/2007 | Diedrich | ................. | H04L 43/00 709/224 |
| 2010/0049654 A1* | 2/2010 | Pilo | ......................... | G06Q 20/02 705/43 |
| 2011/0047098 A1* | 2/2011 | Erlanger | ................ | G06Q 40/02 705/36 R |
| 2014/0277604 A1* | 9/2014 | Nixon | ................ | G05B 19/4185 700/47 |
| 2015/0074048 A1* | 3/2015 | Weisberg | .......... | G06F 17/30348 707/610 |
| 2015/0081567 A1* | 3/2015 | Boyle | ................ | G06Q 20/3829 705/71 |

(Continued)

*Primary Examiner* — Chae M Ko
(74) *Attorney, Agent, or Firm* — Morse, Barnes-Brown & Pendleton, P.C.; Sean D. Detweiler, Esq.

(57) ABSTRACT

A real-time transaction processing system and method include the provision of a real-time transactional data store having an importer subsystem embedded therein. The importer subsystem is configured to connect directly to a real-time data source without using an intermediate subsystem. Events are received via the real-time data source at the importer subsystem, which transacts the events into the real-time transactional data store to create one or more records in the real-time transactional data store corresponding to the events.

24 Claims, 5 Drawing Sheets

(56) References Cited

U.S. PATENT DOCUMENTS

| | | | |
|---|---|---|---|
| 2015/0112857 A1* | 4/2015 | Gellis | G06Q 50/01 |
| | | | 705/39 |
| 2016/0026495 A1* | 1/2016 | Upadrasta | G06F 9/4843 |
| | | | 718/101 |
| 2016/0091334 A1* | 3/2016 | Chakra | G01C 21/3617 |
| | | | 701/425 |
| 2016/0125565 A1* | 5/2016 | Sulatycke | G06T 1/20 |
| | | | 345/522 |
| 2016/0179776 A1* | 6/2016 | Bartley | G06Q 20/401 |
| | | | 715/268 |

\* cited by examiner

EMBEDDED EVENT STREAMING TO A TRANSACTIONAL HIGHLY-AVAILABLE IN-MEMORY DATABASE

CROSS REFERENCE TO RELATED APPLICATION

This application claims priority to and the benefit of U.S. Provisional Patent Application No. 62/266,990, filed on Dec. 14, 2015, and entitled "Embedded Event Streaming to a Transactional Highly-Available In-Memory Database," the entirety of which is incorporated by reference herein.

TECHNICAL FIELD

The present disclosure relates generally to data processing and, more particularly, to systems and methods for connecting real-time data sources to a transaction data store without the use of intermediate third-party systems.

BACKGROUND

Transacting "live" data (as opposed to bulk loading a batch of data) into a relational database is generally performed by a client application. Traditionally, this has been a person at a computer, typing in a transaction of some sort, perhaps a customer order. In this scenario, a client application (a web application, for example) invokes an operation (a transaction) on a database to insert, update or delete a record. Today, it is often the case that machines generate these transactions. Consider, for example, processing website click streams, or smartphone/device location-based processing, or smart grid electric meter periodic updates. These real-time data feeds happen automatically and continuously, without human intervention.

Modern systems that ingest (process) these events use queuing systems and have connectors that deliver events to "sinks," generally some form of data store(s). These queuing systems act as clients to the data store, invoking network (client/server) operations to deliver the event to the data store. A key characteristic of these systems is that both the queuing system and the data store are highly available. As events are being continuously delivered, they must be continuously consumed, even when parts (machines) of the queuing system or parts (machines) of the data store suffer failures (e.g., crash, become unavailable due to network connectivity issues, etc.). However, these intermediate subsystems that act as a clients to a data store result in inefficiencies (e.g., an intermediate hop to the data store is often required, adding time before the data can be processed) and create additional points of failure.

BRIEF SUMMARY

In one aspect, a real-time transaction processing method includes providing a real-time transactional data store having an importer subsystem embedded therein. The importer subsystem is configured to connect directly to one or more real-time data sources without using an intermediate subsystem, such as a client application, third-party code, or a third-party connector. Events are received via the real-time data source at the importer subsystem, which transacts the events into the real-time transactional data store to create one or more records in the real-time transactional data store corresponding to the events. Other aspects of the invention include corresponding systems and computer programs.

The importer subsystem can processes each of the events individually, rather than in batches. The events can be received from the real-time data source asynchronously and can be transacted into the real-time transactional data store asynchronously. Transacting the events into the data store can include transforming the events into a transactional format usable by the real-time data store.

In one implementation, a failure in the importer subsystem is identified. In response, a failover importer embedded in the real-time transactional data store is connected to the real-time data source, and further events are received at the failover importer via the real-time data source. In another implementation, a failure in the real-time data source is identified. In response, the importer subsystem is connected to a failover real-time data source, and further events are received at the importer subsystem via the failover real-time data source. In yet another implementation, failures are identified at both the importer subsystem and the real-time data source, and a failover importer embedded in the real-time transactional data store is connected to a failover real-time data source. Further events are then received at the failover importer via the failover real-time data source.

In one implementation, the real-time transactional data store includes a plurality of data store nodes, with each data store node having a channel configured to receive events for a particular topic on a particular partition of a real-time data source. To recover from a particular failure, one or more channels can be moved among data store nodes.

The details of one or more implementations of the subject matter described in the present specification are set forth in the accompanying drawings and the description below. Other features, aspects, and advantages of the subject matter will become apparent from the description, the drawings, and the claims to persons of ordinary skill in the art and are considered to be within the scope of this disclosure.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
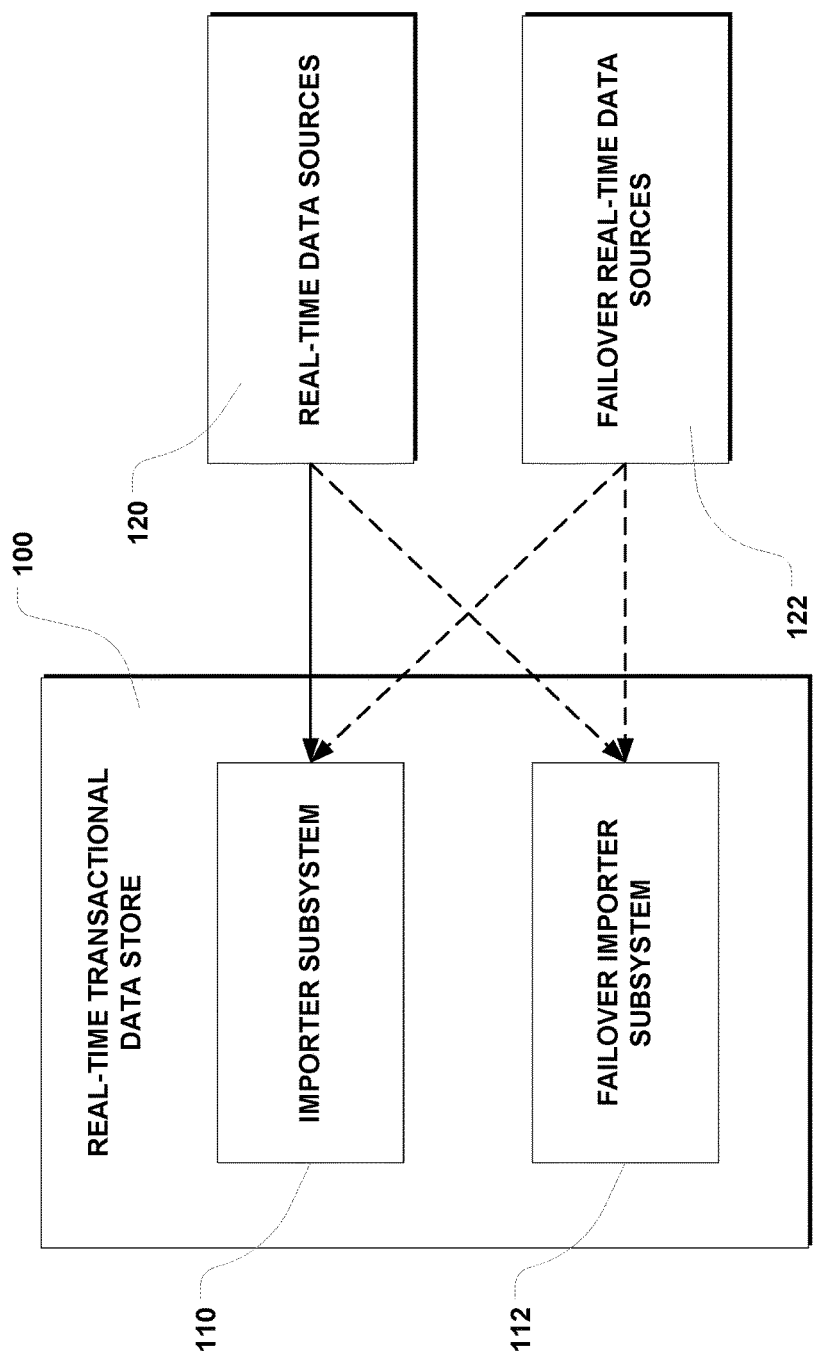
FIG. 1 depicts an example high-level architecture of a real-time transactional system according to an implementation.

Referring to FIG. 1, in one implementation, a real-time transactional system includes a real-time transactional data store 100 that connects directly to real-time data sources 120 and transactionally processes streams of events received from the data sources 120 within a database management system. Real-time data sources 120, or feeds, produce real-time streams of events. Such event streams include, but are not limited to, sensor readings, machine-to-machine communication, World Wide Web user click tracking, and financial market tick data. The disclosed techniques provide for the connection of such real-time data sources 120 to a real-time transactional data store 100 in a real-time transaction processing system without the use of an intermediate subsystem (e.g., a client application, code, connector, or similar intermediary provided by a third party or otherwise) that would be traditionally required in order to accept the event feed and deliver the data in a transactional format to a data store. Advantageously, an importer subsystem 110 can be embedded into the real-time transactional data store 100, without using an intermediate subsystem between the data sources 120 and data store 100. The real-time transactional data store 110 can also include a failover importer subsystem 112, which real-time data sources 120 can communicate with in the event the importer subsystem 110 fails. Similarly, failover real-time data sources 122 can be made available upon the failure of one or more of the real-time data sources 120.

In one implementation, the real-time transactional system includes a single computer or a networked collection of computers having one or more associated data stores. A particular data store can be, for example, a relational or other structured database based on technological implementations including Oracle® MySQL, Oracle® Database, Microsoft® SQL Server, PostgreSQL, or IBM DB2. In other implementations, the real-time transactional system includes one or more virtualized computing units running in a cloud-computing platform.

More generally, implementations of the present system can use appropriate hardware or software. Computers used in the system can run server-class operating systems such as the Microsoft Windows® operating systems, the Linux® operating system and other variants of UNIX® operating systems, Oracle® Solaris®, and the like. Such software can be implemented on a computing device including a processing unit, a system memory, and a system bus that couples various system components including the system memory to the processing unit.

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application implemented in a suitable programming language or framework.

Method steps of the techniques described herein can be performed by one or more programmable processors executing one or more computer programs to perform functions by operating on input data and generating output. Method steps can also be performed by, and systems can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor receives instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

A communications network can facilitate communication among data sources and data stores in the real-time transactional system. The communication can take place over media such as standard telephone lines, LAN or WAN links (e.g., T1, T3, 56 kb, X.25), broadband connections (ISDN, Frame Relay, ATM), and wireless links (802.11 (Wi-Fi), Bluetooth, GSM, CDMA, etc.), for example. Other communication media are contemplated. The network can carry TCP/IP protocol communications and HTTP/HTTPS requests made by a web browser, and the connection between devices and/or servers can be communicated over such TCP/IP networks. Other communication protocols are contemplated.

It should also be noted that implementations of the present techniques can be provided as one or more computer-readable programs embodied on or in one or more articles of manufacture, including non-transitory storage media. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
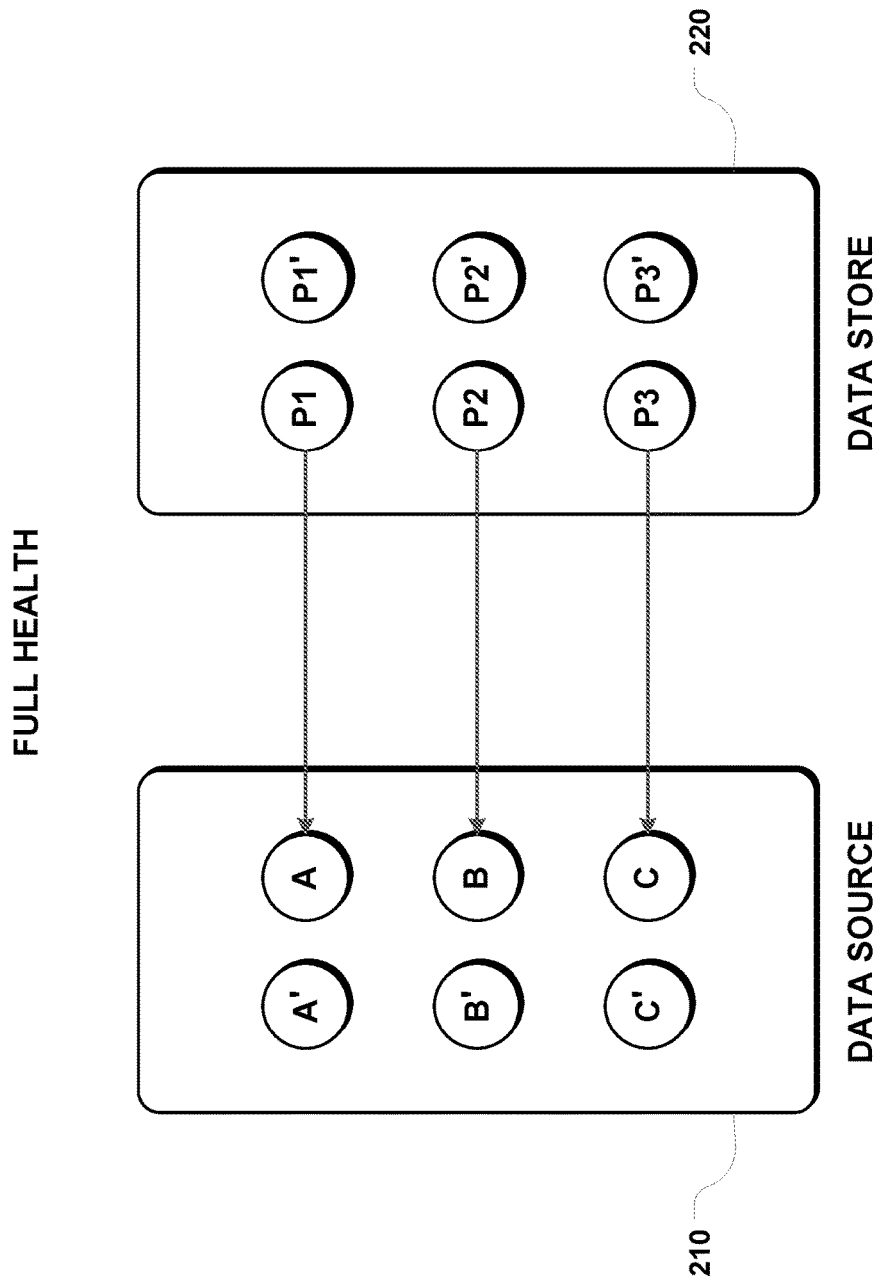
FIG. 2 depicts an example of importer subsystems within a real-time transactional data store that are connected to data feeds of real-time data sources.

Referring to FIG. 2, in one implementation, the real-time transactional system connects directly to one or more data sources 210 using an importer subsystem embedded into the running data store 220, without using an intermediate subsystem between the data 210 source and data store 220. The importer subsystem embedded into the data store 220 includes multiple importer components (P1, P2, P3), each of which is able to connect or "listen" to a different event source (A, B, C) from data sources 210, such as a message queue, socket, or other real-time data source from within the data store 220 itself. As events become available or arrive, each importer component ingests data from its connected stream, transforms the data into a format usable by the data store, and transacts the data into the data store 220.

The importer can be embedded into a database data store by, for example, configuring the database to load an Open Services Gateway Initiative (OSGi) module and placing the importer module in the bundles path for the database. This configuration can be applied to a running database without interruption of on-going processing or can be applied before the database process is started. A customized configuration for the importer can be declared in the database's configuration, in which case the database forwards the importer configuration properties to the loaded importer module.

Various types of importers can be configured, and importers can be either of the push or pull type. For example, log data can be pushed to the data store via a socket. In one implementation, the data store exposes three interfaces to importer modules so that a variety of importer modules can be authored, making the importer system extensible by end-users without direct access to the data store software. The first interface provides a method for configuration to be forwarded to user extensible importers; the second defines the application programming interface (API) that is invoked to parse data received by the importer; and the third provides importers a method to invoke database transactions. As one example, an importer implements the first configuration interface, and configures itself when this upon invocation of the interface using the configuration that is passed through the interface. The importer is instructed by the database to begin accepting data, which is parsed using the second API, and, after each unit of data in the stream is accepted, the importer can invoke a database transaction using the third API.

The ingestion of event streams by an importer can be real-time on a per-event basis. Specifically, the importer component of the data store retrieves one "event" at a time from each of the event stream(s). The event data is decoded by the importer and transformed and inserted into the data store (e.g., into a database table through standard structured query language (SQL) interfaces). Each event is processed individually by the data store and, in some implementations, incoming events are not batched.

The ingestion of events from upstream event sources is a continuous and real-time process. Real-time transactional database event ingestion involves a continuous (non-blocking) extraction of the events from the upstream system. As such, data (events) are read from the event stream immediately upon arrival. Events are then transactionally added to the data store asynchronously (non-blocking), which allows the importer to read subsequent events without waiting for the database operation to complete. Combined, these asynchronous techniques produce an ongoing real-time extraction of content from the external event stream, which is continuously delivered to the data store.

Because the importer subsystem resides within the data store, the stream ingestion process can also leverage existing mechanisms within the data store architecture, such as fault tolerance. For example, an importer can select, through its configuration, to run identically on each node of a distributed data store or to run in a mastership and redundant failover arrangement. The data store provisions importer modules accordingly. Running with redundant failover enabled allows the data store to leverage its distributed fault tolerance, thereby enabling fault tolerance of the importer modules with the modules each implementing full fault tolerance.

Figure 3:
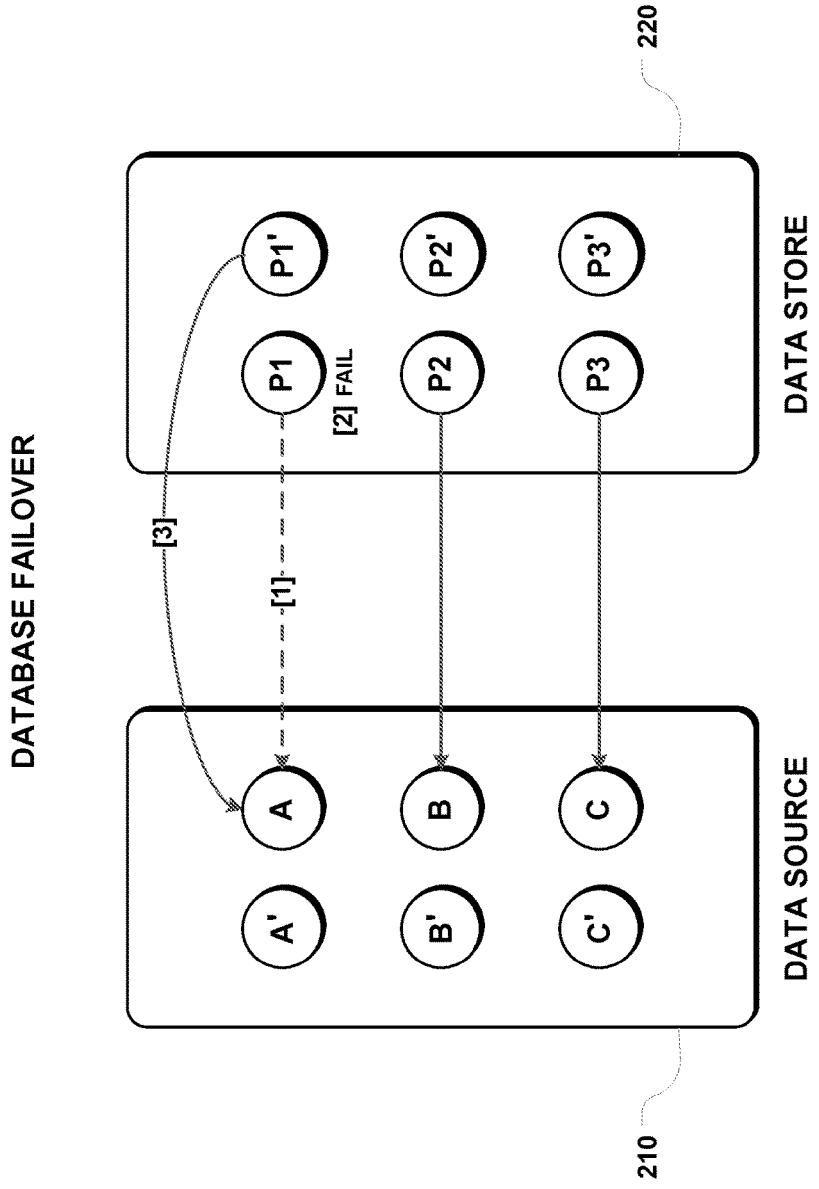
FIG. 3 depicts a failover process for a failure in the real-time transactional data store of FIG. 2.

FIG. 3 depicts a process by which a partial failure in the data store 210 (e.g., a node or database process terminating) does not interrupt real-time stream processing. Step [1] shows the original state, with importer P1 receiving events from event stream A. Upon a failure of importer P1 (Step [2]), the data store 210 fails over to importer P1' (Step [3]) and continues to perform real-time event ingestion from event stream A.

In another implementation, ingestion can be parallelized across the system when it is provided in a distributed form (e.g., multiple distributed nodes in a data store cluster) in order to provide a high level of parallelized throughput. For event streams that are highly available, event ingestion can be coordinated such that duplicate events are not transactionally ingested. Parallel ingestion does not require such coordination among data store nodes. Additionally, by providing importers on multiple data store nodes, the processing of incoming data can be load balanced to achieve increased throughput and reduced execution time.

In some implementations, if an input event stream is highly available, the incoming events are partitioned, generally into "topics" (i.e., streams of events that can be subscribed to) and served across more than one machine. Topics can include "partitions," or subsets of the topic that together make up the entire topic. In this scenario, the data store system, on a per node (process) basis, assigns and coordinates stream ingestion. Specifically, a single data store node in a highly-available data store system is responsible to consume messages for a given topic +partition. This is achieved by coordinating the distribution of "channels" across the data store nodes. Here, a "channel" in an importer is a resource to fetch/ingest data from that can be moved around different nodes of the data store. Each node in the data store cluster can then consume the same incoming topic stream, but on different partitions of the topic. Thus, the partitions are non-overlapping, and ingestion is parallelized.

In some implementations, channels are moveable among different nodes in order to provide fault tolerance. For example, if an importer responsible for a channel fails because of a software, hardware or network error, the channel can be re-assigned to a redundant importer instance on another node. The channel in this case is an assignment of responsibility, and is moved by reaching a distributed agreement on the new assignment. This agreement can be reached using pre-existing components of the data store.

Figure 4:
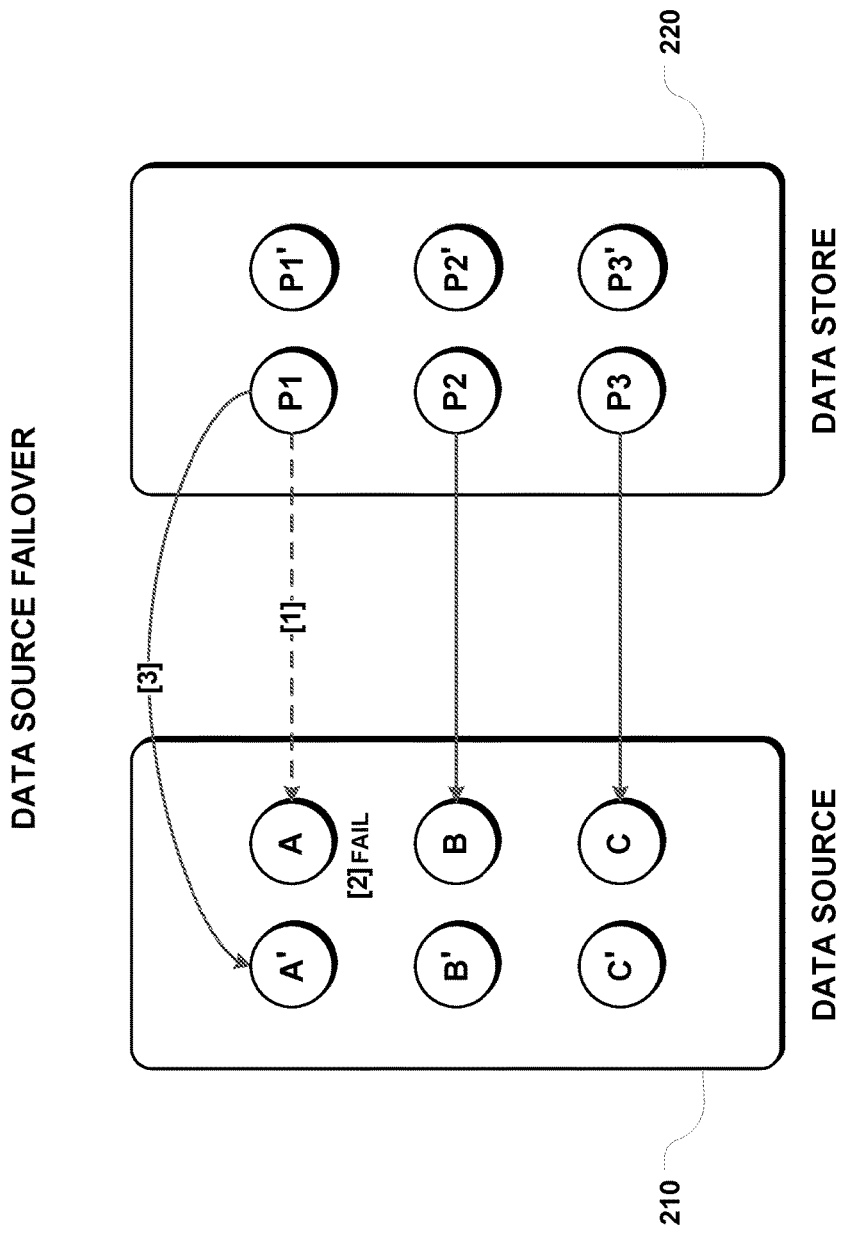
FIG. 4 depicts a failover process for a failure in the real-time data source of FIG. 2.

Referring to FIG. 4, the data store 220 can resume stream ingest at a transactionally consistent point after a failure of an upstream data source 210. If the data source 210 is fault tolerant, the data store 220 utilizes information provided through the fault tolerance mechanism to resume the processing of events from the point of failure. Step [1] of FIG. 4 depicts the original state, with importer P1 of the data store 220 receiving events from event stream A of the data source 210. Upon a failure of event stream A (Step [2]), importer P1 in the data store 220 fails over to event stream A' (Step [3]) and continues to perform real-time event ingestion from event stream A'.

Figure 5:
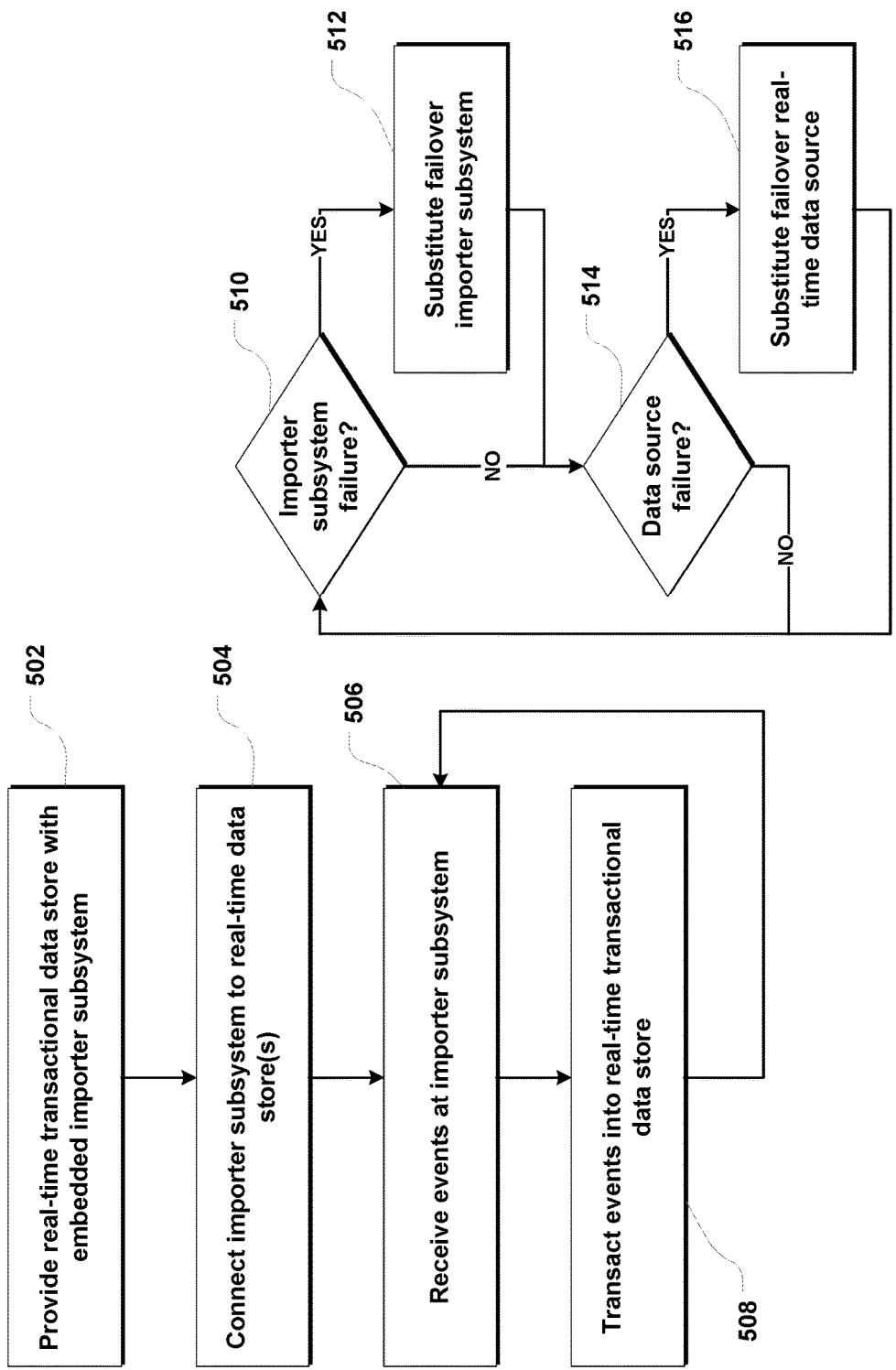
FIG. 5 depicts an example method for transacting events into a real-time transactional data store according to an implementation.

FIG. 5 depicts one implementation of a method for transacting events into a real-time transactional data store without the use of intermediate third-party connectors or similar components, according to the techniques described above. In Step 502, a real-time transaction data store including an embedded importer subsystem is provided. The importer subsystem is connected to a real-time data source, notably, without using an intermediate subsystem (e.g., client application, third-party code, and/or a third-party connector) (Step 504). As events are received at the importer subsystem via the real-time data source (Step 506), the events are transacted by the importer subsystems into the real-time transactional data store to create records corresponding to the events (Step 508). The process returns to Step 506 as additional events are received.

In parallel, the importer subsystem and data source are monitored to determine if either or both have failed. If the importer subsystem is determined to have failed (Step 510), a failover importer subsystem embedded in the real-time transactional data store can instead be connected to the real-time data source (Step 512). If, on the other hand, the data source fails (Step 514), the importer subsystem can be connected to a failover real-time data source (Step 516). Similarly, if both the importer subsystem and real-time data source fail, the failover importer subsystem can be connected to and receive events from the failover real-time data source.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
providing a real-time transactional data store comprising an importer subsystem embedded therein, wherein the real-time transactional data store comprises a transactional database, and wherein the importer subsystem comprises an importer module loaded by the transactional database;
connecting directly the importer subsystem to a real-time data source without using an intermediate subsystem that transforms data from the real-time data source into a transactional format usable by the transactional database;
receiving a plurality of events at the importer subsystem via the real-time data source; and
transacting, by the importer subsystem, the events into the real-time transactional data store to create one or more records in the real-time transactional data store corresponding to the events.

2. The method of claim 1, wherein the intermediate subsystem comprises at least one of a client application, third-party code, and a third-party connector.

3. The method of claim 1, further comprising connecting directly the importer subsystem to a plurality of real-time data sources.

4. The method of claim 1, wherein the importer subsystem processes each of the events individually and not in one or more batches.

5. The method of claim 1, wherein the events are received from the real-time data source asynchronously.

6. The method of claim 1, wherein the events are transacted into the real-time transactional data store asynchronously.

7. The method of claim 1, wherein transacting the events further comprises transforming the events into a transactional format usable by the real-time transactional data store.

8. The method of claim 1, further comprising:
identifying a failure in the importer subsystem;
connecting to the real-time data source a failover importer embedded in the real-time transactional data store; and
receiving further events at the failover importer via the real-time data source.

9. The method of claim 1, further comprising:
identifying a failure in the real-time data source;
connecting the importer subsystem to a failover real-time data source; and
receiving further events at the importer subsystem via the failover real-time data source.

10. The method of claim 1, further comprising:
identifying a failure in the importer subsystem and the real-time data source;
connecting to a failover real-time data source a failover importer embedded in the real-time transactional data store; and
receiving further events at the failover importer via the failover real-time data source.

11. The method of claim 1, wherein the real-time transactional data store comprises a plurality of data store nodes, each data store node having a channel configured to receive events for a particular topic on a particular partition of a real-time data source.

12. The method of claim 11, further comprising moving a channel from a first one of the data store nodes to a second one of the data store nodes to recover from a failure.

13. A real-time transaction processing system comprising:
a real-time transactional data store comprising an importer subsystem embedded therein and configured to connect directly to a real-time data source without using an intermediate subsystem that transforms data from the real-time data source into a transactional format usable by the transactional database, wherein the real-time transactional data store comprises a transactional database, and wherein the importer subsystem comprises an importer module loaded by the transactional database;
at least one memory for storing computer-executable instructions; and
at least one processing unit for executing the instructions on the at least one memory, wherein execution of the instructions programs the at least one processing unit to perform operations comprising:
receiving a plurality of events at the importer subsystem via the real-time data source; and
transacting, by the importer subsystem, the events into the real-time transactional data store to create one or more records in the real-time transactional data store corresponding to the events.

14. The system of claim 13, wherein the intermediate subsystem comprises at least one of a client application, third-party code, and a third-party connector.

15. The system of claim 13, wherein the importer subsystem is configured to connect directly to a plurality of real-time data sources.

16. The system of claim 13, wherein the importer subsystem processes the each of the events individually and not in one or more batches.

17. The system of claim 13, wherein the events are received from the real-time data source asynchronously.

18. The system of claim 13, wherein the events are transacted into the real-time transactional data store asynchronously.

19. The system of claim 13, wherein transacting the events further comprises transforming the events into a transactional format usable by the real-time transactional data store.

20. The system of claim 13, wherein the operations further comprise:
identifying a failure in the importer subsystem;
connecting to the real-time data source a failover importer embedded in the real-time transactional data store; and
receiving further events at the failover importer via the real-time data source.

21. The system of claim 13, wherein the operations further comprise:
- identifying a failure in the real-time data source;
- connecting the importer subsystem to a failover real-time data source; and
- receiving further events at the importer subsystem via the failover real-time data source.

22. The system of claim 13, wherein the operations further comprise:
- identifying a failure in the importer subsystem and the real-time data source;
- connecting to a failover real-time data source a failover importer embedded in the real-time transactional data store; and
- receiving further events at the failover importer via the failover real-time data source.

23. The system of claim 13, wherein the real-time transactional data store comprises a plurality of data store nodes, each data store node having a channel configured to receive events for a particular topic on a particular partition of a real-time data source.

24. The system of claim 23, wherein the operations further comprise moving a channel from a first one of the data store nodes to a second one of the data store nodes to recover from a failure.

* * * * *